United States Patent [19]

Ito

[11] Patent Number: 5,398,337

[45] Date of Patent: Mar. 14, 1995

[54] METHOD FOR COLLECTING AND STORING DATA

[75] Inventor: Toshiro Ito, Aichi, Japan

[73] Assignee: Mitsubishi Denki Kabushiki Kaisha, Tokyo, Japan

[21] Appl. No.: 80,061

[22] Filed: Jun. 23, 1993

Related U.S. Application Data

[63] Continuation of Ser. No. 581,618, Sep. 12, 1990, abandoned.

[30] Foreign Application Priority Data

Sep. 12, 1989 [JP] Japan ................................. 1-236042

[51] Int. Cl.⁶ .......................................... G06F 15/40
[52] U.S. Cl. ............................ 395/600; 364/DIG. 2; 364/920; 364/962
[58] Field of Search ................. 364/DIG. 1, DIG. 2; 395/600, 700

[56] References Cited

U.S. PATENT DOCUMENTS

| | | | |
|---|---|---|---|
| 3,940,742 | 2/1976 | Hudspeth et al. | 340/172.5 |
| 4,791,564 | 12/1988 | Takai | 364/200 |
| 4,870,577 | 9/1989 | Karasawa et al. | 364/405 |
| 4,888,727 | 12/1989 | Getson, Jr. et al. | 364/900 |
| 5,163,148 | 11/1992 | Walls | 395/600 |

FOREIGN PATENT DOCUMENTS 0059829 9/1982 European Pat. Off. .
0166402 1/1986 European Pat. Off. .

Primary Examiner—Gareth D. Shaw
Assistant Examiner—Kakali Chaki
Attorney, Agent, or Firm—Sughrue, Mion, Zinn, Macpeak & Seas

[57] ABSTRACT

A data collection and storage method is disclosed wherein data is stored in a sequence of files in time-serial fashion. Data is first stored in a temporary file, following which the temporary file is redesignated so as to receive the name of one of a series of permanent storage files. This arrangement allows the permanent storage files to be read out while data continues to be collected, eliminating a bottle neck which heretofore existed in the art.

6 Claims, 6 Drawing Sheets

METHOD FOR COLLECTING AND STORING DATA

This is a Continuation of application Ser. No. 07/581,618, filed Sep. 12, 1990, now abandoned.

BACKGROUND OF THE INVENTION

The present invention relates to a method of storing data employing an auxiliary storage of the type having a comparatively small capacity.

In a conventional programmable controller (referred to as a PC hereinafter) monitoring equipment is generally used to monitor a controlled object device and collect input/output data flowing between the PC and the control device which data is related to the control process. The collected data is inputted to the monitoring equipment from or via the PC and stored in an auxiliary storage.

FIG. 5 is a block diagram showing the constitution of a PC and its monitoring equipment. In FIG. 5, numeral 1 designates the PC, which comprises a CPU unit 2, a communication I/F unit 3, an input unit 4 and an output unit 5. Numeral 6 designates an object device to be controlled by means of PC 1, connected to the PC through a cable. Numeral 8 designates the monitoring equipment, 9, a communication means; 10, a CPU; 11, an operation range memory; 12, a system program memory; 13, a time measuring means; 14, an auxiliary storage; 15, a keyboard used as an input means, and 16, a display unit.

The monitoring equipment 8 comprised of the aforementioned elements 9–16 is connected to the PC 1 through connecting cable 17.

FIG. 6 is a flow chart showing the schema of the system program of the monitoring equipment 8, which flow chart is performed by accessing the system program stored in the system memory 12 shown in FIG. 5, by means of the CPU 10. The collection, compilation and the like of the input/output data related to the control process are performed at the time of monitoring the object device 6 by means of the monitoring equipment.

FIGS. 7 and 8 are flow charts showing in detail the processing steps of data collection and file compilation in the flow chart shown in FIG. 6.

FIG. 9 is a view showing the relation of the respective files stored in the auxiliary storage 14 in FIG. 5. In FIG. 9, 43 designates a collected data storage file which stores, in a time series manner, data collected at predetermined times. In each file 43, the data 45 indicates the collection time and 46 indicates the collected data obtained through the PC 1 and stored in order of collection. Numeral 44 designates a compilation file for extracting from the files 43 and storing such portions required for preservation, in which compilation file 44 the data 45 indicating the collection time and the collected data 46 obtained through the PC are stored.

The operation of this system will now be explained. In FIG. 5, the PC 1 computes input information concerning the object device 6 input through the input unit 4, by means of the CPU unit 2, and controls the object device 6 through the output unit 5 according to the computed results. The results obtained by the computation of the CPU unit 2 are transmitted to the communication means 9 of the monitoring equipment 8 through the communication I/F unit 3 and the connection cable 17. The monitoring equipment 8 writes the data received through the communication means 9 in the operating range memory 11 and sequentially processes the data by means of the CPU 10 according to the system program stored in the system program memory 12.

In FIG. 6, the first step in the procedure is the setting of the conditions (timing, a certain data value, etc.) which will trigger data collection or designate the data which will be collected. Then, in step 201, data output via interface 3 is received and written in the work area memory 11 through the communication means 9. Then in step 202, it is judged whether the trigger condition(s) of data collection are established or not, for example whether the time measuring means 13 reaches a given time or not, whether certain conditions on the PC data are met or not and so on. If so, the process of data collection is started in step 203.

Step 203 is shown in detail in FIG. 7. When started in step 203, the process of reading out the appointed data from the PC is performed in step 204 and it is judged in step 205 whether it is possible to carry out file access to the collected data storage file 43 stored in the auxiliary storage 14. For example, if the collected data storage file 43 is not then being read out, file access is judged to be possible and the collected data storage file 43 is accessed so as to write the read out data 46 together with the collection time data thereinto. As shown in FIG. 9, the collection time data 45 and the read out collected data 46 are written and stored in the storage file 43 in a time serial manner.

Then in step 207, it is judged whether a writing error was generated due to, e.g., lack of capacity in the auxiliary storage 14 at the time of file writing. If writing can not be performed due to lack of capacity, it is necessary for the operator to delete a portion of collected data storage files 43. If the given conditions are not established in the respective judgements of steps 205 and 207, an error process is performed in step 208 and the start step 203 for the data collection process is completed in step 209.

Then in step 210, it is judged whether file compilation is required with respect to the collected data storage files 43, by checking the input means 15. When it is, the process of file compilation is started in step 211.

Step 211 is the process of file compilation, shown in detail in FIG. 8. Upon starting this process in step 211, range setting is performed in step 212 so as to set the extent to which the content of the collected data storage file 43 will be stored as a compilation file 44. This is carried out by, for example, appointing the start and end collection times. A search for the conditions set by the range setting process is performed in step 213.

Subsequently, step 214 performs the read process for reading out data from the collected data storage file 43, and step 215 performs the writing process to write the data read out in step 215 to form the compilation file 44 so as to complete the file compilation process.

It is judged in step 217 whether monitoring is completed or not. In case the completion condition is not established, the collected data are displayed by the display unit 16 in step 218 and the process returns to step 201 again so as to repeat the operation, initiating from the process of reading out the data received from the PC 1 in the operating range. If the completion condition is established in step 217, the monitoring completion process is performed in step 219 so as to complete the series of processes in step 220.

According to the conventional data collection method, there are problems in that the size of the collected data storage files 43 is increased by carrying out additional writing every time data is collected. It is necessary for the operator to know the residual storage capacity of the auxiliary storage 14 which stores the above-mentioned collected data storage files and to carry out file deletion when residual capacity becomes small. It is impossible to write the collected data into a collected data storage file when making up a compilation file because the collected data storage file is being read out when the compilation file is being made up.

SUMMARY OF THE INVENTION

The present invention is intended to solve the aforementioned problems and has as its objects the provision of a data collection method capable of collecting data without concern about the lack of capacity of an auxiliary storage, and capable of collecting and storing data even while a compilation file is being made up.

The method of collecting and storing data according to the present invention comprises the steps of:

providing storage means with a capacity corresponding to a predetermined number of collected data storage files, and capable of storing data collected at predetermined times;

creating a series of files by first storing said collected data in a temporary file when data collection is carried out, and subsequently changing the temporary file into a collected data storage file by a renaming process; and renewing the series of files by deleting the oldest data storage files of the series, each time collection is carried out, after said collected data storage files reach a predetermined number.

According to the present invention, a storage means is provided with a storage capacity corresponding to a predetermined number of collected data storage files, and capable of storing collected data. A temporary file is made up to temporarily store the collected data whenever the aforementioned data is collected. The temporary file is subsequently changed into a collected data storage file, so as to create a series of collected data storage files. When the collected data storage files reach the predetermined number, the file contents are deleted, in order from the oldest data file, every time data collection is carried out, so as to renew the series of files. The temporary file storing the newest collected data is changed to this data storage file.

DETAILED DESCRIPTION OF THE PREFERRED EMBODIMENTS

One embodiment of a method according to the present invention will be explained with reference to the drawings. In this embodiment, since the hardware of the PC 1 and the monitoring equipment 8 is similar to the conventional structures shown in FIG. 5, a detailed explanation thereof will be omitted. Components designated by the same symbols as in the prior art arrangement represent the same or corresponding elements.

Figure 1:
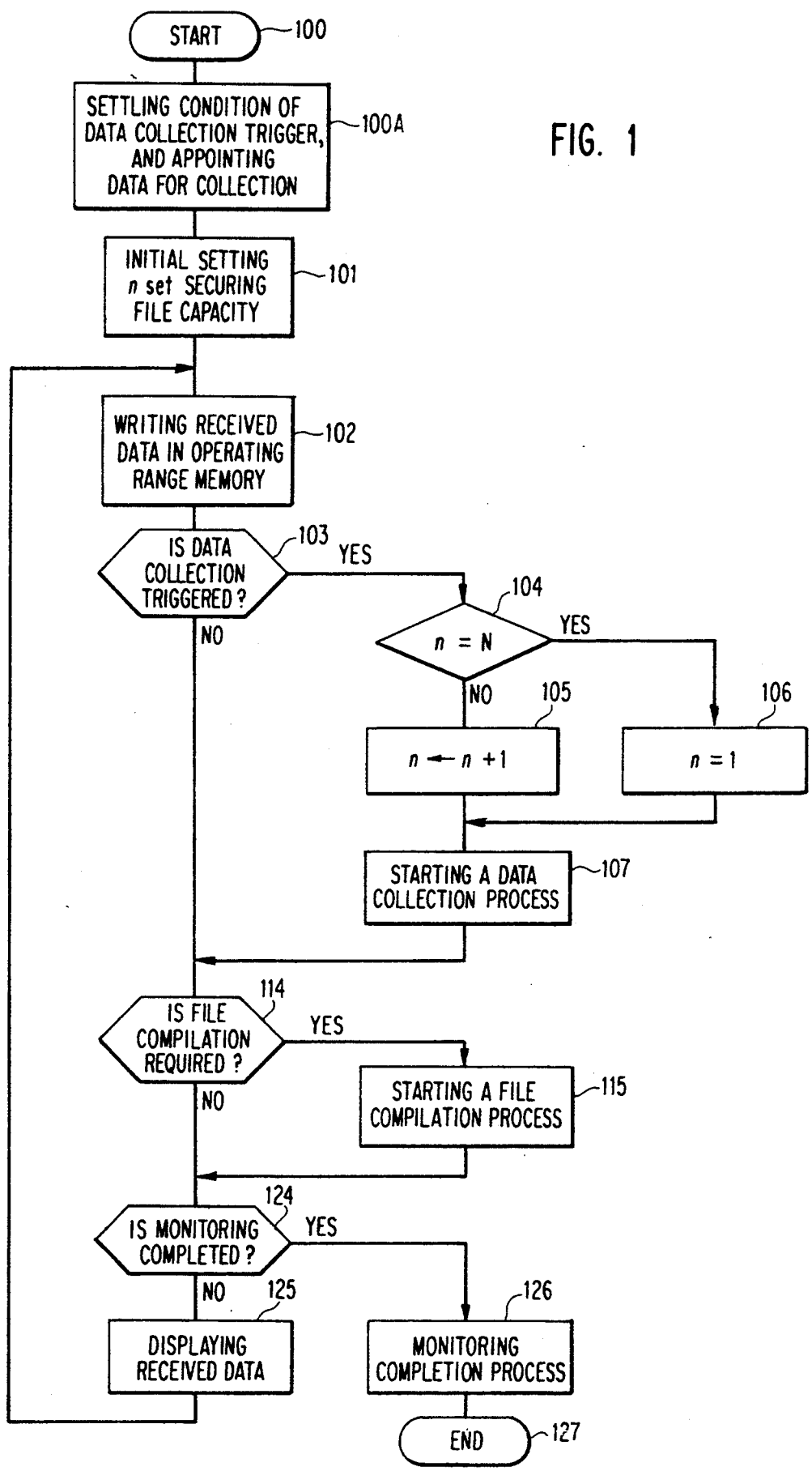
FIG. 1 is a schematic flow chart of a system program for a PC monitor, illustrating one embodiment of the data collection method of the present invention.
Figure 2:
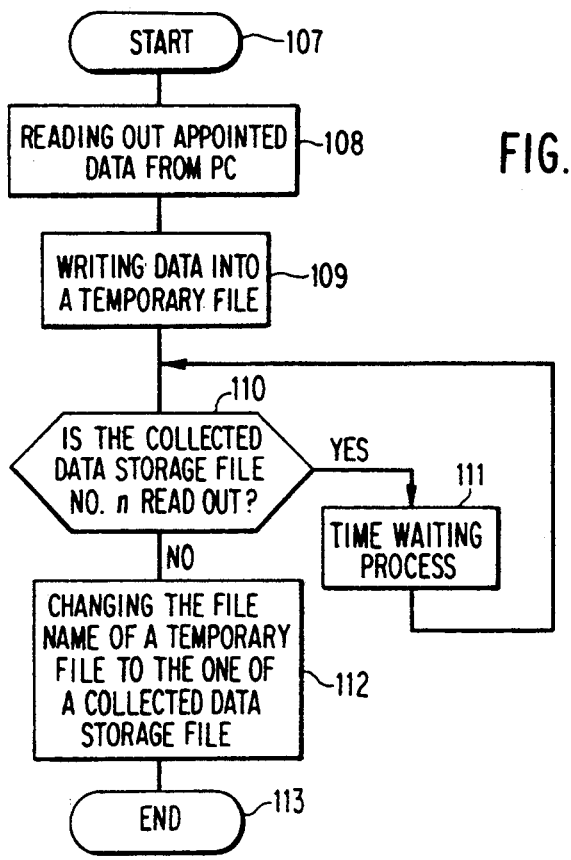
FIG. 2 is a flow chart of a data collection process shown in FIG. 1.
Figure 3:
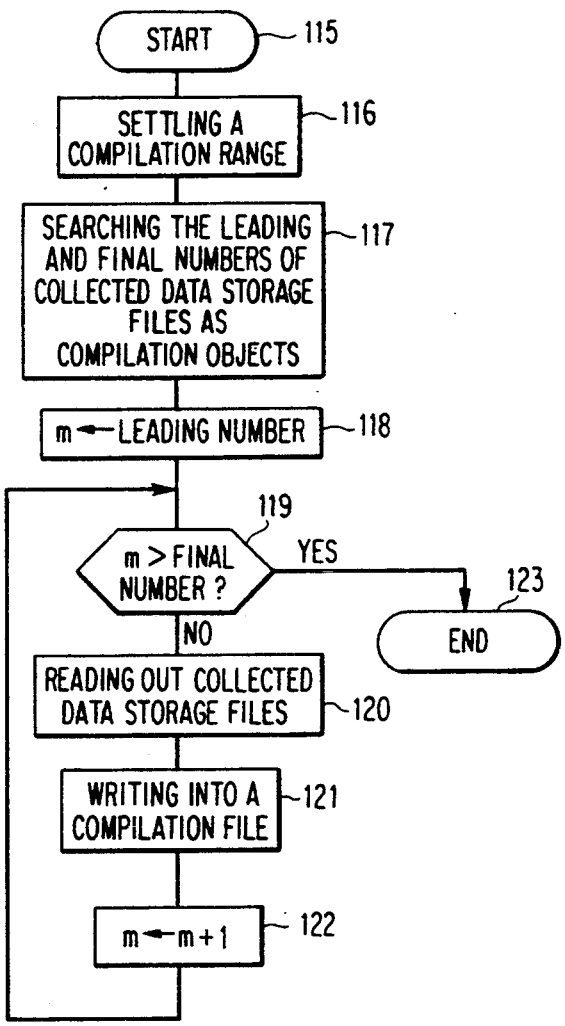
FIG. 3 is a flow chart of a file compilation process shown in FIG. 1.

FIG. 1 is a flow chart showing the schema of a system program for the monitoring equipment 8 employing the method of the present invention. In FIG. 1, the collection and compilation of input/output data related to control processes of the object device 6 controlled by the PC 1 are carried out. FIG. 2 and FIG. 3 are flow charts showing in detail the process steps of the data collection process and the compilation process in the flow chart shown in FIG. 1, respectively.

Figure 4:
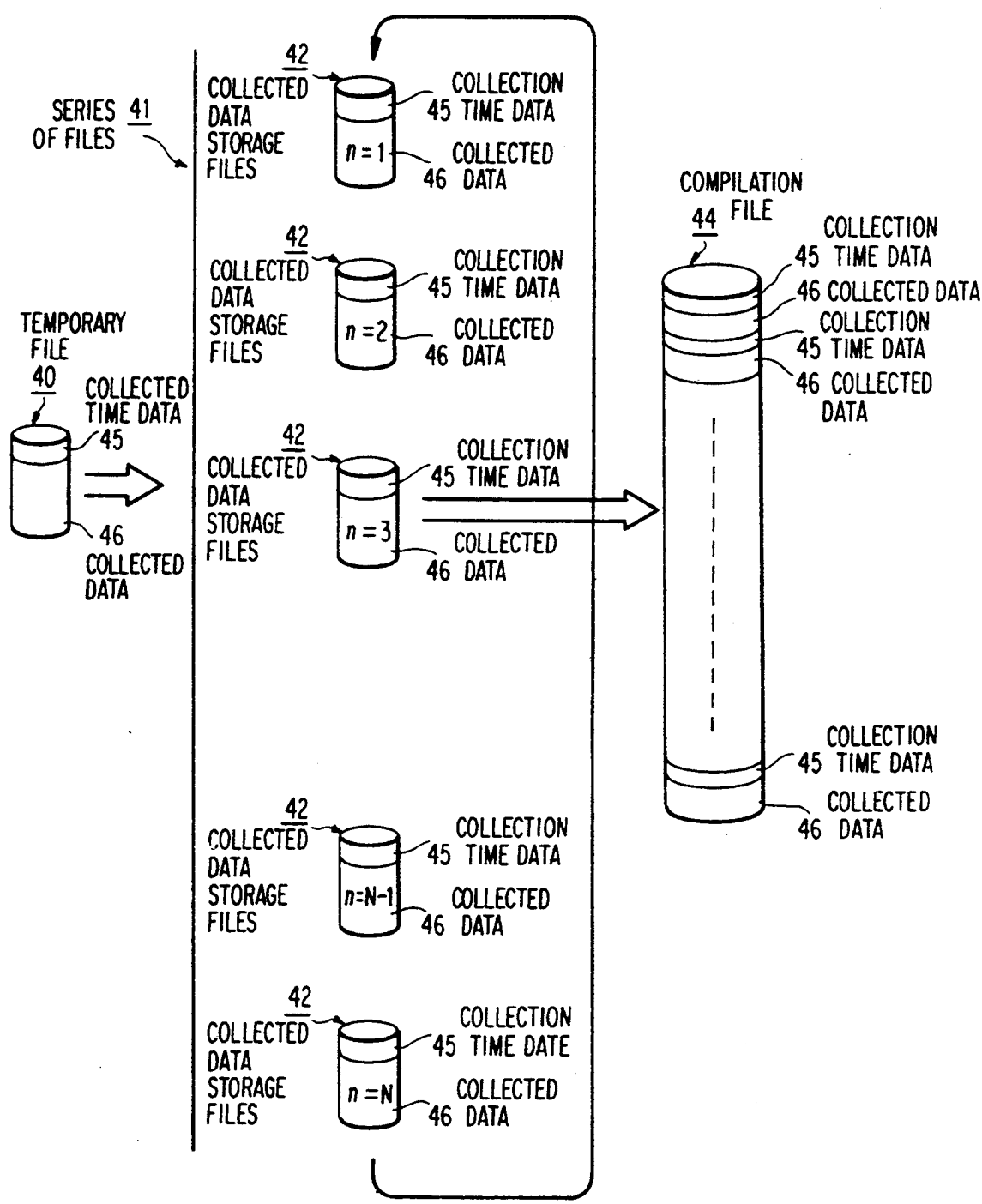
FIG. 4 is a view showing the relationship among respective files stored in an auxiliary storage, according to one embodiment of the present invention.
Figure 5:
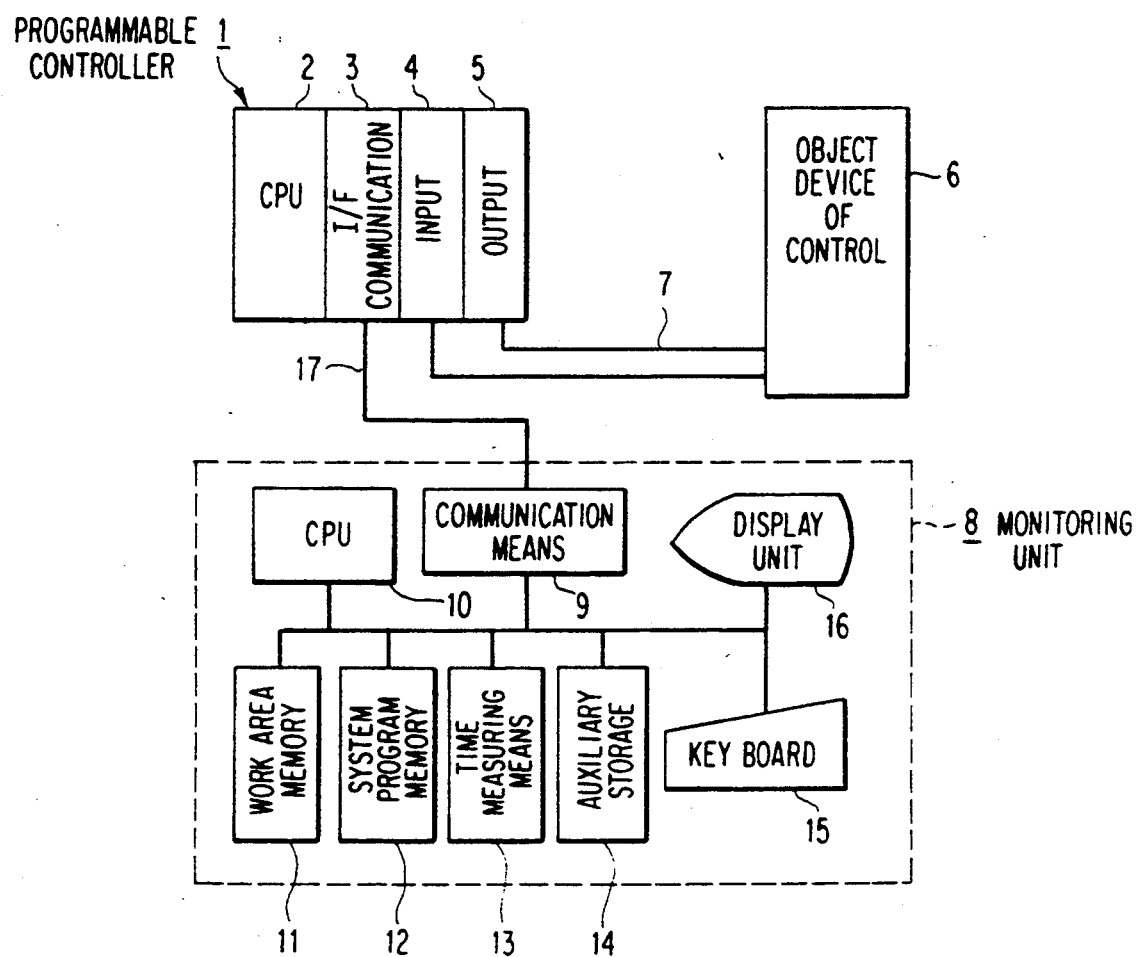
FIG. 5 is a block diagram showing the construction of the monitoring equipment for the PC, the hardware being common to both the present invention and the conventional embodiment.
Figure 6:
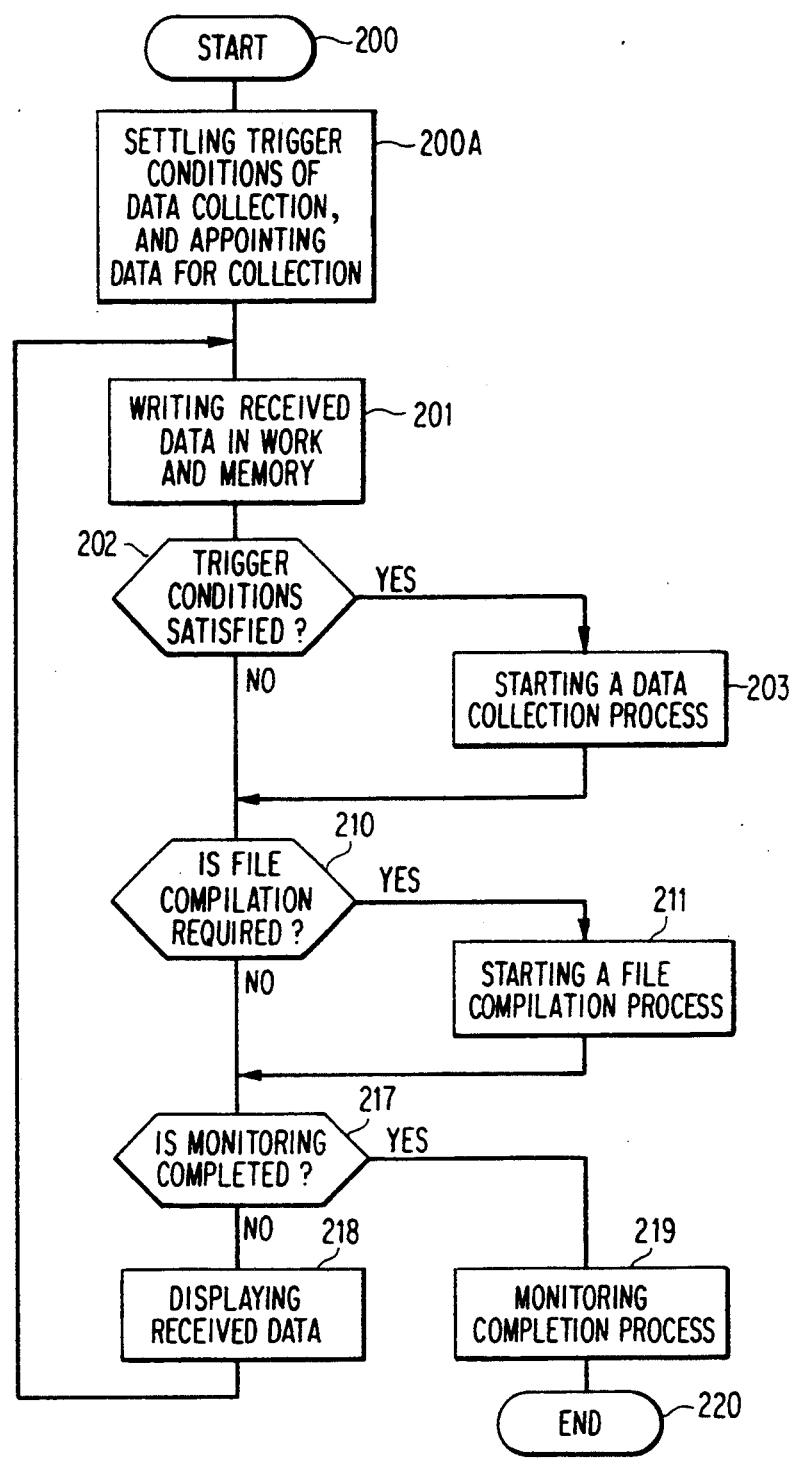
FIG. 6 is a schematic flow chart of the system program of a conventional monitor.
Figure 7:
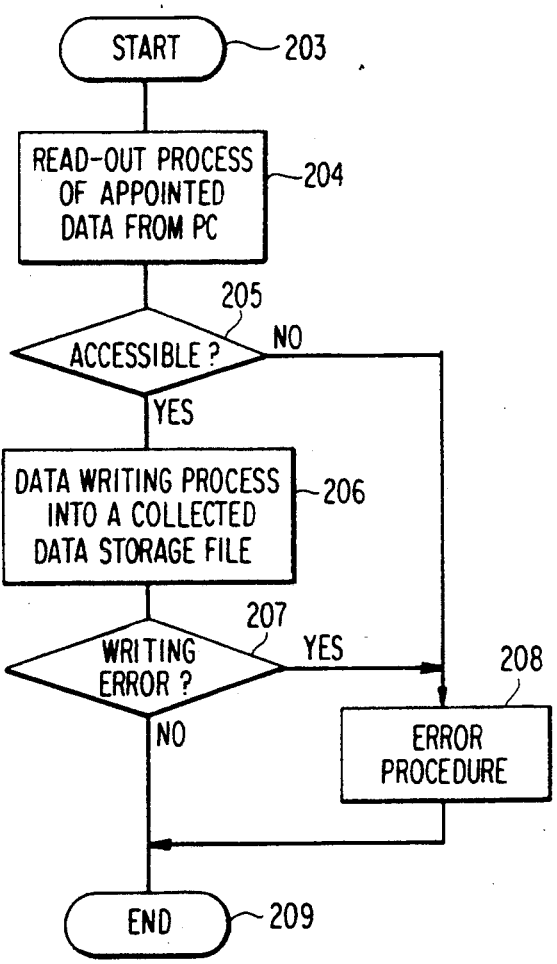
FIG. 7 is a flow chart of a data collection process shown in FIG. 6.
Figure 8:
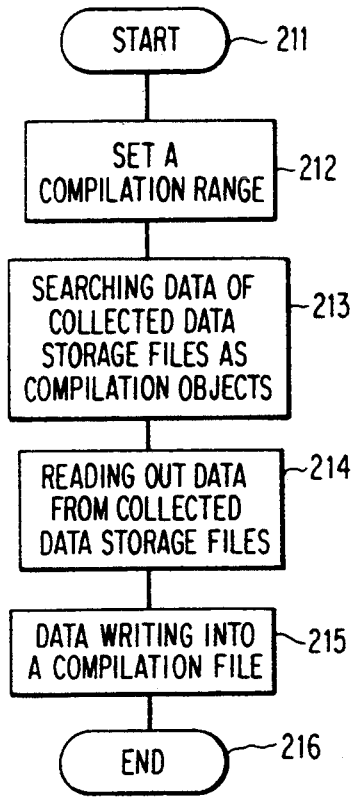
FIG. 8 is a schematic flow chart of a file operation process shown in FIG. 7.
Figure 9:
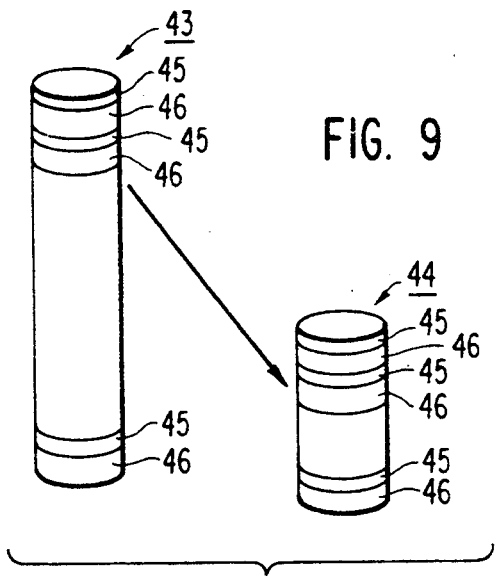
FIG. 9 is a view showing the relationship among respective files stored in the auxiliary storage.

FIG. 4 is a view showing the respective files and the relationship thereamong, which files are stored in the auxiliary storage 14 of the monitoring equipment 8 shown in FIG. 5. In FIG. 4, symbol 40 designates a temporary file, symbol 41 indicates a series of files comprising "N" collected data storage files 42, and symbol 44 is a compilation file made up from all or part of the series of the collected data storage files 41, allowing for the keeping or reusing of the data.

The temporary file 40 and the collected data storage files 42 of N in number are capable of storing data to be collected at a given time, and the number N is suitably selected such that the required memory space does not exceed the range of the storage capacity of the auxiliary storage 14. The collected data comprise the input/output data 46 of the control process for the controlled object device 6, transmitted from the PC 1 and collected, along with data showing the collection time.

The operation of this system will now be explained. In FIG. 5, the whole of the output information sent from the PC 1 to the object device 6 and the input information sent from the object device 6 to the PC are transmitted from the PC to the monitoring equipment 8. The processing procedures before the monitoring equipment receives this information are the same as in the conventional system.

In the method of the present invention, as shown in FIG. 4, the auxiliary storage 14 is provided in advance with storage files 42 numbering N together with one temporary file 40, which all hold dummy data. The collected data storage files 42 are numbered n=1 through N. The collected data 46 (the information transmitted from the PC 1) is supplemented by data obtained from the time measuring means 13 to indicate the time when the aforementioned data are transmitted and stored in the temporary file 40. Since transmission of data from the PC to the monitoring equipment 8 is carried out intermittently, the temporary file 40 will be made to store the data of one transmission. Subsequently, the dummy content of the n=1 file is deleted and the temporary file 40 is changed to , i.e., becomes, the n=1 data storage file by changing its file name. A new temporary file 40 is designated and stands by for the next data transmission from the PC. By repeating the abovementioned operations every time data is transmitted from the PC, a portion of the dummy data is deleted (eventually it is all deleted) and the then temporary file 40 is changed into one of the collected data files 42, so as to make up a series of files. When the number of collected data storage files 42 reaches N, the operation is returned to the first of the series of files 41 and the previously collected data starts to be deleted in order from the top of the file (the oldest data). The deleted file's name is then used to designate the temporary file, whereby the series of files 41 is renewed.

If the stored collected data 46 are read out for reuse and compiled, the numbers of the first and final collected data storage files 42 storing the desired data are searched out and the data are read out and stored in a compilation file 44. The compilation file 44 can be freely located in either the auxiliary storage 14 or in other storage means.

The operations described above will now be explained in detail with reference to the flow charts shown in FIGS. 1 through 3. In FIG. 1, step 100 starts the operation and in step 101, the value "n" is set to the number of the collected data storage file in which writing was carried out in the last operation, assuming that there was one, during the initial process carried out when the system program for the monitoring equipment 8 is initiated. File capacity is also secured during this step. When data are to be collected for the first time, one temporary file 40 and collected data storage files numbering N are made up with dummy information in the auxiliary storage 14. The data storage files are numbered from n=1 to N so as to make up a series of files 41. As an initial value, the number n=0 is set. At step 100A, data collection trigger conditions are set. These conditions may include, for example, specific data values, specific time windows, and other data or memory-specific events.

At step 102, the data transmitted from the PC 1 and received by the monitoring equipment 8 in the work area memory 11 is read and step 103 judges whether the trigger condition(s) for data collection are established or not. As mentioned above, the trigger conditions may include whether the time measuring means 13 reaches an appointed time, whether read-out conditions for the data of the PC read into the operating range memory 11 are established, and so on. If the trigger conditions for data collection are established, step 104 judges whether n=N, namely, whether collected data has been stored in the final file 42 of the series. If n=N is not established, step 105 carries out an increment process (n=n+1). If n=N step 106 sets n=1 and performs an initialization process, whereby the next collected data will be stored at the leader position in the series of files.

Step 107 starts the data collection process, and is shown in FIG. 2 in detail. When starting step 107, step 108 performs the reading out of the appointed data from the PC and step 109 performs the writing process for writing the collected data, comprised of the read out data 46 and data 45 indicating the collection time, into the temporary file 40. In step 110 it is judged whether data storage file No. n is currently being read out, e.g.,to form part of a compilation file 43. If storage file n is currently in the read-out mode, step 111 inserts a waiting period following which the operation returns to step 110. Generally, since the file reading process is faster than the writing process, the monitoring equipment is not adversely affected by the short wait. When step 110 judges that the given file is not being read-out, step 112 deletes the collected data (either dummy data or previously collected data) of storage file No. n and changes the file name of the temporary file 40 to that of data storage file No. n. The operation then advances via end step 113 to step 114, (FIG. 1).

In step 114 it is judged whether file compilation is required or not by checking the inputs from input means (keyboard) 15. If required, step 115 starts the file compilation process.

The file compilation process, is shown in detail in FIG. 3. In FIG. 3, upon starting in the process in step 115, step 116 determines the range of the data (i.e., the range of file numbers from which to obtain data) to be collected and stored in a compilation file 44. For example, the range setting process may determine the first and last collection time of interest, and the corresponding file numbers.

Then steps 118 through 120 perform a search process to locate and read data from the first through final files (whose numbers are between 1 and N) which define the determined range. That is, step 118 sets the desired leading or starting data storage file number equal to variable m, and subsequently step 119 judges whether the variable m is larger than the final number. If the variable m is smaller than the final number, step 120 performs a read-out process to read out collected data storage file No. m, and subsequently step 121 performs a write process to write the read out data into compilation file 44.

Thereafter, in step 122 an incrementation process m←m+1 is performed, and the process returns to step 119 so as to judge again whether variable m is larger than the final number. When m is finally larger than the final number in step 119, the operation is completed (step 123) and the flow advances to step 124 in FIG. 1.

Step 124 judges whether monitoring is completed. If completion conditions are not established, step 125 causes the display of the collected data on the display unit, and the operation returns to step 102 so as to repeat the above processes. If monitoring completion conditions are established in step 124, step 126 performs monitoring completion processes and the operation is terminated in step 127.

As noted above, according to the invention, the storage means is provided with a storage capacity corresponding to a predetermined number of collected data storage files, and a series of files is made up by first making a temporary file, storing the collected data, and then changing the temporary file to a collected data storage file, by changing the file designation. The series of files are renewed in order from the oldest file after the collected data storage files reach a predetermined number. Advantageously, the compilation of collected data can be carried out while data collection is carried out and a data storage method can be obtained in which data collection is never adversely affected by the lack of storage capacity.

What is claimed is:

1. A method of collecting and storing data, comprising the steps of:

providing a monitoring unit including a CPU and an electromagnetic storage means with a storage capacity corresponding to at least a predetermined number of storage files;

providing a controller for collecting data, at predetermined intervals, to be sent to and stored in the electromagnetic storage means via a communication means;

using the CPU for creating a series of data storage files in the electromagnetic storage means by repeating the process of first designating a temporary storage file in the electromagnetic storage means for an initial storage of collected data, storing, each at a time, said collected data at predetermined intervals in said temporary file during data collection, and subsequently renaming the temporary file as one of said data storage files, said data storage files being available for access while the collected data is being stored in said temporary file;

using the CPU for indefinitely over-writing said series of data storage files, after the number of said data storage files created is equal to said predetermined number, by repeating the process of deleting data stored in the data storage files in order, one data storage file at a time, starting with an oldest file stored, redesignating the data storage file from which data has been deleted as said temporary file, storing, each at a time, said collected data at predetermined intervals in said temporary file in the electromagnetic storage means during data collection, and subsequently renaming the temporary file as one of said data storage files, said data storage files being available for access while the collected data is being stored in said temporary file.

2. A method of collecting and storing data, comprising the steps of:

providing a monitoring unit including a CPU and an electromagnetic storage means with a storage capacity corresponding to at least a predetermined number of data storage files;

providing a controller for collecting data, at predetermined intervals, to be sent to and stored in the electromagnetic storage means via a communication means;

using the CPU for creating a series of data storage files in the electromagnetic storage means by repeating the process of first designating a temporary file in the electromagnetic storage means for an initial storage of collected data, storing, each at a time, said collected data at predetermined intervals in said temporary file during data collection, and subsequently renaming the temporary file as one of said data storage files, said data storage files being available for access while the collected data is being stored in said temporary file; and using the CPU for deleting data stored in the data storage files in order, one data storage file at a time, starting with an oldest file, for storing newly collected data, only after the number of said data storage files equals said predetermined number.

3. A method as claimed in claim 2, further comprising a step of using the CPU for checking a read-out status of one of said data storage files before renaming the temporary file as said one of said data storage files; and using the CPU for delaying said renaming step if said one of said data storage files is being read out for compilation.

4. A method of collecting and storing data, comprising the steps of:

providing a monitoring unit including a CPU and an electromagnetic storage means with a storage capacity corresponding to at least a predetermined number of data storage files;

providing a controller for collecting data, at predetermined intervals, to be sent to and stored in the electromagnetic storage means via a communication means;

using the CPU for creating a series of data storage files in the electromagnetic storage means by repeating the process of first designating a temporary storage file in the electromagnetic storage means for an initial storage of collected data, storing the collected data in said temporary storage file during data collection so that said data storage files are available to be accessed while the collected data is being stored in said temporary storage file, and subsequently renaming the temporary storage file as one of said data storage files after first checking a read-out status of said one of said data storage files, said renaming step being delayed if said checking step determines that said one of said data storage files is being read-out for compilation; and using the CPU for deleting data from the data storage files in order, one data storage file at a time, starting with an oldest file, for storing newly collected data only after the number of said data storage files equals said predetermined number.

5. A method of collecting and storing data, comprising the steps of:

providing a monitoring unit including a CPU and an electromagnetic storage means having a predetermined number of storage files, said storage files initially containing dummy data;

providing a controller for collecting data at predetermined intervals, to be sent to and stored in the electromagnetic storage means via a communication means;

using the CPU for over-writing the dummy data in said storage files by repeating the process of first designating one of said storage files containing dummy data as a temporary file, storing, each at a time, said collected data at predetermined intervals in said temporary file during data collection, and subsequently renaming the temporary file as a data storage file, said data storage file being available for access while the collected data is being stored in said temporary file;

using the CPU for indefinitely over-writing said data storage files, after all of said storage files containing dummy data have been over-written, by repeating the process of deleting data stored in the oldest data storage file, redesignating the data storage file from which data has been deleted as a temporary file, storing, each at a time, said collected data at predetermined intervals in said temporary file during data collection, and subsequently renaming the temporary file as one of said data storage files, said data storage files being available for access while the collected data is being stored in said temporary file.

6. The method of claim 5 further comprising the step of providing a time measuring means in communication with said controller.

* * * * *